(12) United States Patent
Hammer et al.

(10) Patent No.: US 8,627,301 B2
(45) Date of Patent: Jan. 7, 2014

(54) CONCURRENT MANAGEMENT OF ADAPTIVE PROGRAMS

(75) Inventors: Matthew Hammer, Stoughton, WI (US); Mohan Rajagopalan, Mountain View, CA (US); Anwar Ghuloum, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 1968 days.

(21) Appl. No.: 11/750,441

(22) Filed: May 18, 2007

(65) Prior Publication Data

US 2008/0288950 A1 Nov. 20, 2008

(51) Int. Cl.
*G06F 9/44* (2006.01)
*G06F 9/45* (2006.01)

(52) U.S. Cl.
USPC ........... 717/158; 717/132; 717/128; 717/130; 717/131; 717/149; 717/156

(58) Field of Classification Search
None
See application file for complete search history.

(56) References Cited

U.S. PATENT DOCUMENTS 6,009,452 A * 12/1999 Horvitz .................... 718/102
2007/0234326 A1 * 10/2007 Kejariwal et al. ......... 717/151

OTHER PUBLICATIONS

Acar et al, "Adaptive Functional Programming", 2002, ACM.*
R. Kramer, "The Combining DAG: A Technique for Parallel Data Flow Analysis", 1994, IEEE Transactions on parallel and distributed systems, vol. 5.*
Bender, et al., "On-the-Fly Maintenance of Series-Parallel Relationships in Fork-Join Multithreaded Programs", Proceedings of the sixteenth annual ACM symposium on Parallelism in algorithms and architectures (SPAA'04), Barcelona, Spain, Jun. 27-30, 2004, 12 pages.
Hammer, et al., "CEAL: A C-Based Language for Self-Adjusting Computation", Technical Report—Toyota Technological Institute Chicago (TTIC-TR-2009-2), 2009, 36 pages.
Acar, et al., "Adaptive Functional Programming", ACM Transactions on Programming Languages and Systems, vol. 28, No. 6, Nov. 2006, pp. 990-1034.

* cited by examiner

*Primary Examiner* — Lewis A Bullock, Jr.
*Assistant Examiner* — Mark Gooray
(74) *Attorney, Agent, or Firm* — Grossman, Tucker, Perreault & Pfleger, PLLC

(57) ABSTRACT

A method for concurrent management of adaptive programs is disclosed wherein changes in a set of modifiable references are initially identified. A list of uses of the changed references is next computed using records made in structures of the references. The list is next inserted into an elimination queue. Comparison is next made of each of the uses to the other uses to determine independence or dependence thereon. Determined dependent uses are eliminated and the preceding steps are repeated for all determined independent uses until all dependencies have been eliminated.

11 Claims, 2 Drawing Sheets

CONCURRENT MANAGEMENT OF ADAPTIVE PROGRAMS

FIELD

The present disclosure relates to adaptive computer programs and the management thereof. In particular, the present disclosure teaches processes for the management of adaptive programs in a parallel environment such as a multi-core processing system.

BACKGROUND

In the most general terms, an adaptive program is a program in which changes in input are automatically propagated to the output. That is to say, the output reflects changes in input values without having to rerun the whole program, and only those parts affected by the changes are re-evaluated. The advent of multi-core processing technologies enables parallel processing of different kinds of applications, many of which often require a "divide and conquer" approach.

For applications such as video, vision, graphics, audio, physical simulation, gaming, and mining, such parallelism allows the program to meet application speed requirements and take advantage of faster multi-core technologies. Adaptive programming is especially useful in such multi-core processor systems and has been shown to significantly improve the running time of such "divide and conquer" style methods. Current approaches to adaptive programs have mainly been explored in the context of functional languages and the approaches have been tailored to uni-processor based sequential execution methods. Efforts to date to manage adaptive programming processes have been exclusively serial in nature and have lacked advances in concurrent or parallel adaptive programming.

This disclosure presents primitives that enable a parallelizable approach to adaptive programming in imperative (non-declarative) languages. This disclosure also presents methods and mechanisms that allow one to efficiently perform change propagation in a parallel process, as in multi-core processors, enabling effective optimization of data parallelism for multi-core architecture, which will further enable and promote parallel software development.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
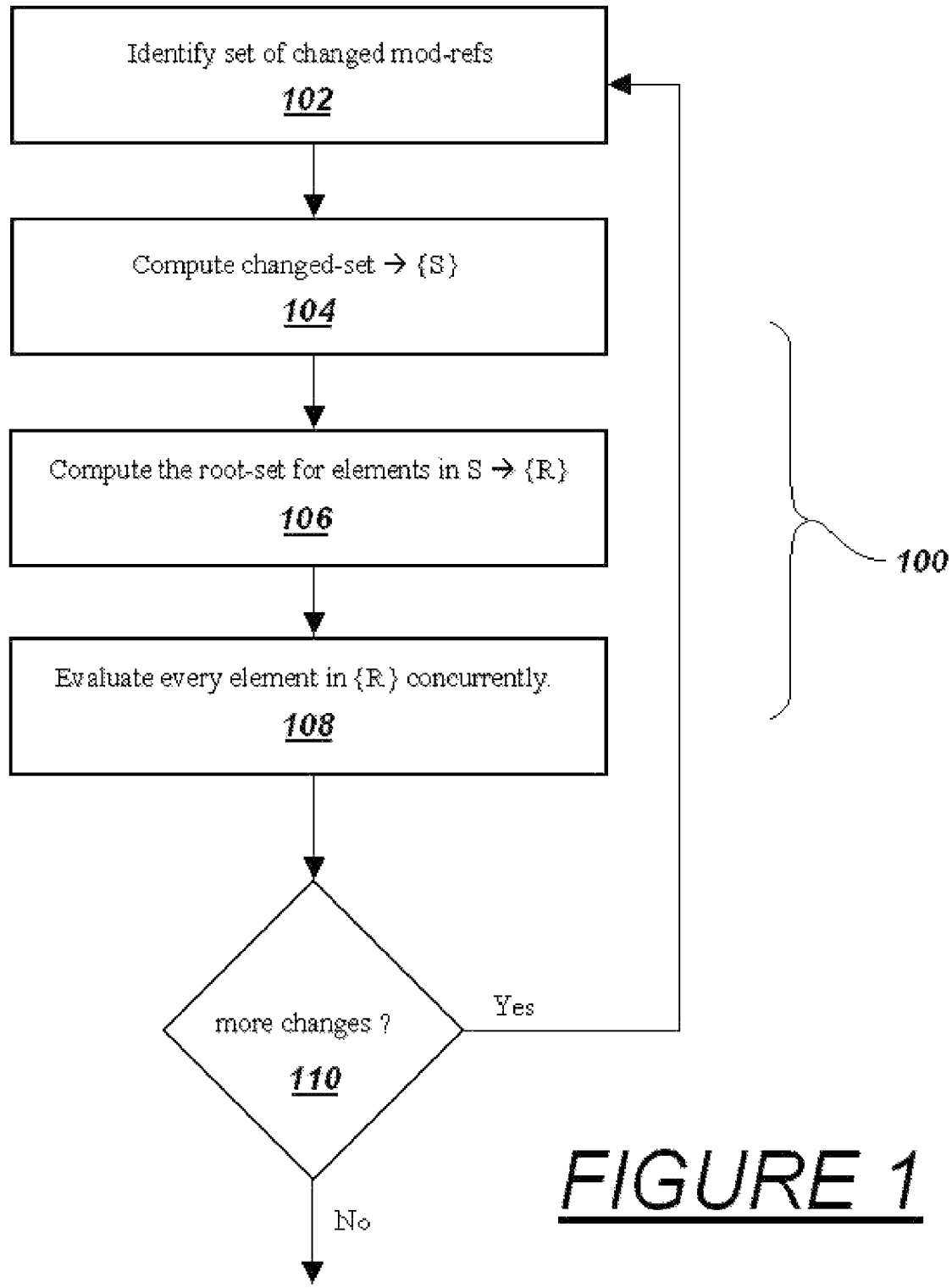
FIG. 1 is a concurrent change propagation method according to the disclosure.

Although the following detailed description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

A key aspect of an adaptive program is the automatic tracking and efficient propagation of changes in the system state. To implement this functionality, each "step" in the program is tracked, essentially recording how all pieces of data are produced and consumed, and inter-leaving (control-flow or data-flow) constraints are tracked. One way of obtaining this information is by exhaustively recording the state in a program's execution trace. The steps in the trace essentially describe the different operations that can be performed and how changes need to be propagated through the system.

Each independent unit of data is typically abstracted opaquely by a modifiable reference (modref). Modrefs are immutable, in the sense that they may be written to only once. In order to change the value associated with a modref, the original is invalidated and a new modref is created to replace the original. The modref's application programming interface (API) essentially provides three primitive operations: read, write and create. Create creates a new modref cell whereas write updates the value associated with a modref. Read allows the program to use the value of a modref, that has been previous written into, and records within the structure of the given modref where and when the value has been used. Moreover, if the data is not available, the program must perform some evaluation to produce the data and populate the modref before execution continues. Read operations have traditionally been performed with eager evaluation methods and this imposes a sequential evaluation order.

Traditionally, modrefs have been processed with eager evaluation methods in a serial execution setting; each modref always holds data before it is read, and is empty before it is written. Eager evaluation generally refers to a mode of operation in which tasks are executed (evaluated) as soon as they are created. On the other end of the spectrum, lazy evaluation refers to a mode of operation in which tasks are executed only when their results are required. A first feature of the disclosed system is a new primitive, called a "lazy modref". Lazy or lenient evaluation refers to a mode of operation in which tasks need not be executed as soon as they are created, however, idle resources (processors, hardware threads, etc.) are free to process created tasks as they desire.

In general, if the number of resources is large, then there is a high probability that the tasks would have been processed before their results are required.

Lazy modrefs improve on traditional modrefs by allowing such lenient or lazy evaluation methods. These methods are the basis for parallelizing adaptive programs. In the disclosed setting, a lenient execution model is used where each lazy-modref can be empty, typically after creation. Alternatively, the lazy-modref may contain a ready-to-read value or a continuation that will work to populate the value once executed. This continuation may also populate the lazy-modref with yet another continuation. This continues in loop fashion until the lazy-modref is populated with a data value. This is guaranteed to eventually occur under correct usage of the API and framework. When the lazy-modref holds such a continuation, the programmer has setup a process to eventually write to the lazy-modref when executed. Since each process can be executed leniently, the programmer may not have written to the lazy-modref yet. The lazy modref's API provides the same three primitive operations as traditional modrefs—create, write and read—with similar methods. However, a fundamental difference is that lazy-modrefs' signatures are based on destination-passing-style methods and that the caller manage the memory used to store the result. Decoupling the store in this way is essential for enabling lenient evaluation methods and forms the basis for parallelizing adaptive programs.

A set of interconnected modrefs tracks changes to the system state. The execution trace is abstracted out as a binary tree of modrefs that describes nodes where data is created and consumed, and where the different control and data-flow dependencies leading to these nodes are created and consumed. The dependency constraints are exposed through the seq-split primitives. This information may be used to identify nodes where the computation can be parallelized.

A second feature of the disclosed system is a mechanism for parallelizing change propagation in an adaptive program. Change propagation describes the process of updating system state in response to some change in the input set. The parallel change propagation method is similar to the serial change propagation method except that in order to preserve correctness in the presence of parallelism we need to rely on recording extra information about uses of modrefs. This information, stored in the modrefs themselves, is used at runtime to identify nodes that need to be recomputed to make appropriate adjustments to the output values. Any given modref may have multiple read locations that may be dependent on each other. A separate mechanism maintains and facilitates querying for these relationships which is called the "dependence structure".

The method 100 works as shown in FIG. 1. A set of changed modrefs 102 is first identified, which correspond to the parts of the program's input that have changed. Next is computed a list of uses ("reads") 104 of these modrefs using the records made in their structures each time they're used. This list is called the "invalidated uses". Next is computed each invalidated use 106 and inserted into an elimination queue, which is similar to a conventional queue except that its methods for "insert" differ: when an element is to be inserted, it is compared 108 against every element in the queue for dependence. If any element in the queue is dependent (the new element precedes this element in question according to our dependence structure) the dependent element is dropped from the queue. Likewise, if the element being inserted is found to be dependent on any element already in the queue, the insertion process stops and the new element is dropped.

Once each invalidated use has been processed with the elimination queue, the elements left in the queue are independent of one another as well as independent of all elements originally in the set of invalidated uses. Modrefs are next examined 110 for changes in value, upon the occurrence of which re-execution proceeds for each use (which is itself a continuation) in parallel. Upon re-execution some other modrefs may change value, upon which the change propagation method for each of these (or each subset of these) is re-instated.

Unlike prior art approaches, there are several opportunities for parallelization in the disclosed process. First, each execution of the program itself has independent components which may be executed in parallel. Next, since these components' independence is stored precisely by the dependence structure, false dependencies causing needless re-execution are circumvented and the ability to re-execute these components in parallel is gained, should they require re-execution.

This is the first and only system that is capable of parallel change propagation. This is the only work that supports imperative language features. This is the first approach to parallelize adaptive programs.

Next, order maintenance in adaptive programs is addressed. Order maintenance involves three operations, insert, remove and compare, which modify and query a total ordering. Insert is the operation that adds a new element to the ordering immediately after an existing element. Remove removes a given element. Given two elements in the ordering, compare computes whether they have a less-than, an equal-to, or a greater-than relationship. In the order maintenance routine of the disclosure, the problems traditionally associated with order maintenance are solved for the three operations with amortized constant-time on a machine where arithmetic can be done in constant time. This disclosure solves traditional order maintenance problems for concurrent adaptive or incremental computation for fine-grained dependent task graphs in constant time. Additionally, this disclosure enables the use of a truly lock-free data structure for concurrent updates.

In existing adaptive programs, a total ordering is used to efficiently represent and later query the execution trace. This total order is used when querying dependency information and forms the basis for doing insert, read and compare operations in constant time. However, this representation fails to support parallel execution methods. Since each step of the method has a distinct position in the trace of the method, only serial updates may be realized. To elaborate, once they are included in the total-ordering, steps that are conceptually independent may appear to be dependent. The presently disclosed representation solves this problem by efficiently encoding the dependency information while eliminating such false dependencies. This provides a means for identifying and scheduling parallel tasks while retaining the constant time bounds.

Figure 2:
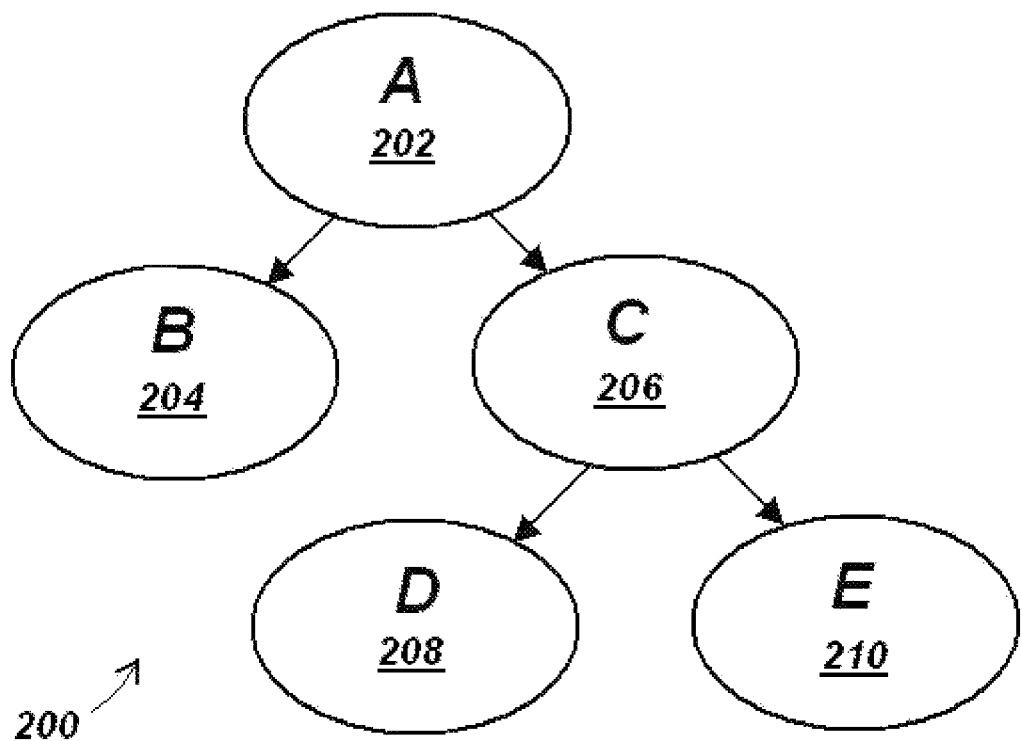
FIG. 2: is a schematic diagram of a recovering partial order maintenance scheme according to the disclosure, using a combination of two orders.

One can check for dependency by comparing the rank in the two total orders (TO), #1 and #2. In general, approximation of a partial order is made through a combination of total orders. Specifically, a combination of two total orders may be used for a large class of programs to recover the original partial order, which conveys dependency information, exactly. FIG. 2 illustrates the gist of this approach. Intuitively, the approach corresponds to choosing two complementary topological sorts of the partial order. This method may select the two total orders correctly. In one embodiment, no more than constant overhead is added for each operation when compared to the original scheme.

All of the dependency information contained within the trace of the adaptive program may be represented as a binary tree. A language may be developed that can be used to verify this property. While there may be arbitrary dependencies in the task graph, the reduction to a binary tree is performed by annotating the graph using three special nodes: read nodes, split nodes and sequence nodes. Read nodes represent a data dependency on some cell of memory and may have a single child which conceptually encloses the "use" of this data value. Split and sequence nodes represent control flow and each has two children. Sequence node children are ordered and are referred to as "first" and "second" children. Split nodes introduce independence and their children are referred to as "left" and "right" children. After annotating with these nodes the original task-graph reduces into a binary tree. The two total orderings can be thought of as two topological sorts of this binary tree, though they are created on-line, as the tree is created. The first total ordering is a depth-first walk of the tree, where "first" is visited before its sibling "second" in sequence nodes and "left" is visited before its sibling "right" in split nodes. This is generally called "English" ordering. The second ordering is the same, except that children of split nodes are visited in reverse order ("right" and then "left"), which is generally called "Hebrew" ordering.

Referring to FIG. 2, the herein disclosed order maintenance scheme 200 is depicted in schematic form. In the diagram, ranking of the orders is in accordance with the following guide:

|  | A(202) | B(204) | C(206) | D(208) | E(210) |
|---|---|---|---|---|---|
| Rank in total order #1 (English): | 1 | 2 | 3 | 4 | 5 |
| Rank in total order #2 (Hebrew): | 1 | 5 | 2 | 3 | 4 |

B depends on A iff: Rank(B) > Rank(A) in both total orders.

The disclosed scheme maintains these two total orderings in a manner that is similar to the way a single total order is traditionally maintained except that any two dependent read nodes, A 202 and B 204, will appear in both orderings with A before B, whereas two independent read nodes, C 206 and D 208, will appear in differing orders in the two total orderings. One will report that D precedes C and the other will report that C precedes D. The particular order that reports D first versus C first is of no consequence, so long as both dependence and independence with constant overhead may be detected using these differing outcomes.

Two instances of the original total ordering data structure are used. Each total ordering is a doubly-linked list of labeled elements, where the label is a 32-bit or 64-bit word that represents its relative position in the ordering. Each read node introduces two elements into each total order to mark its beginning and ending points. Each split node and sequence node introduces a single element into each total order to mark its "middle", which is an element that separates the node's two children and each of its children's successors. The methods of mapping threads uses this "middle" element abstraction to distribute work to a worker thread. New threads look for work using the middle elements that correspond to split nodes. Note that this ensures that all worker threads work on logically independent regions of the data structure. Thus another feature of the scheme is the lack of reliance on locks for accessing and updating the total ordering data structure concurrently. This is the first work aimed at developing a concurrent order-maintenance data structure, yet these methods have the same complexity bounds as the state of the art for sequential versions.

Various features, aspects, and embodiments have been described herein. The features, aspects, and numerous embodiments described herein are susceptible to combination with one another as well as to variation and modification, as will be understood by those having skill in the art. The present disclosure should, therefore, be considered to encompass such combinations, variations, and modifications. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for an adaptive computer program comprising:
    populating one or more modifiable references with task information;
    employing idle resources to cooperate with said one or more modifiable references and process assigned tasks in a background mode using said task information;
    providing task results on an as-needed basis;
    tracking system state changes by said one or more modifiable references;
    generating an execution trace as a binary tree of said one or more modifiable references, said trace describing nodes where data is created and consumed, and where different control and data-flow dependencies leading to said nodes are created and consumed;
    exposing said dependencies through sequence and split primitives in said binary tree;
    generating two total orderings based on the binary tree, wherein the two total orderings include a first total ordering comprising a depth-first ordering and a second total Hebrew ordering;
    sequentially comparing the order of the nodes of the two total orderings to determine at least one exposed dependency, wherein an exposed dependency is when a first node precedes a second node in both total; and
    using the exposed dependencies to identify computations of nodes to parallelize.

2. The evaluation method of claim 1 wherein said one or more modifiable references are unpopulated or contain only ready-to-read values or values resulting from one or more previously assigned tasks immediately prior to said populating.

3. The evaluation method of claim 2 further comprising:
    re-populating one or more of said one or more modifiable references with continuing task information; and
    providing continuing task results on an as-needed basis.

4. The evaluation method of claim 3 wherein said idle resources are taken from the group including processors and hardware threads.

5. The evaluation method of claim 4 wherein said one or more modifiable references comprise signatures based on destination-passing-style methods.

6. The evaluation method of claim 1 further comprising:
    parallelizing said computations.

7. An article comprising an adaptive computer program stored on non-transitory storage medium that if executed enables a system to:
    populating one or more modifiable references with task information;
    employing idle resources to cooperate with said one or more modifiable references and process assigned tasks in a background mode using said task information;
    providing task results on an as-needed basis;
    tracking system state changes by said one or more modifiable references;
    generating an execution trace as a binary tree of said one or more modifiable references, said trace describing nodes where data is created and consumed, and where different control and data-flow dependencies leading to said nodes are created and consumed;
    exposing said dependencies through sequence and split primitives in said binary tree;
    generating two total orderings based on the binary tree, wherein the two total orderings include a first total ordering comprising a depth-first ordering and a second total Hebrew ordering;
    sequentially comparing the order of the nodes of the two total orderings to determine at least one exposed dependency, wherein an exposed dependency is when a first node precedes a second node in both total; and
    using the exposed dependencies to identify computations of nodes to parallelize.

8. The article of claim 7 wherein said one or more modifiable references are unpopulated or contain only ready-to-read values or values resulting from one or more previously assigned tasks immediately prior to said populating.

9. The article of claim 8 wherein said computer program further enables said system to;
   re-populate one or more of said one or more modifiable references with continuing task information; and
   provide continuing task results on an as-needed basis.

10. The article of claim 9 wherein said idle resources are taken from the group including processors and hardware threads.

11. The article of claim 10 wherein said one or more modifiable references comprise signatures based on destination-passing-style methods.

* * * * *